Oct. 17, 1961 F. E. GUPTILL, JR 3,004,544
CONTINUOUSLY MEASURING SLURRY DENSITY
Filed Dec. 29, 1955 3 Sheets-Sheet 1
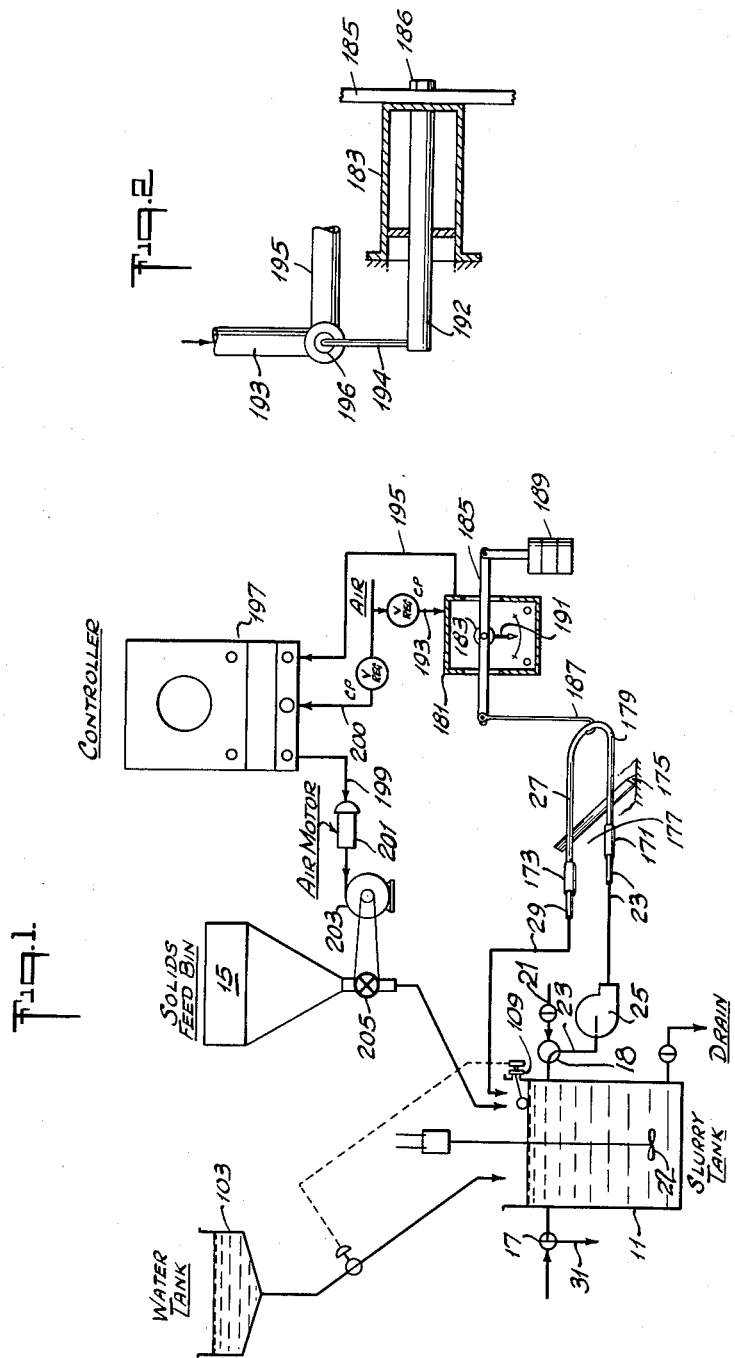

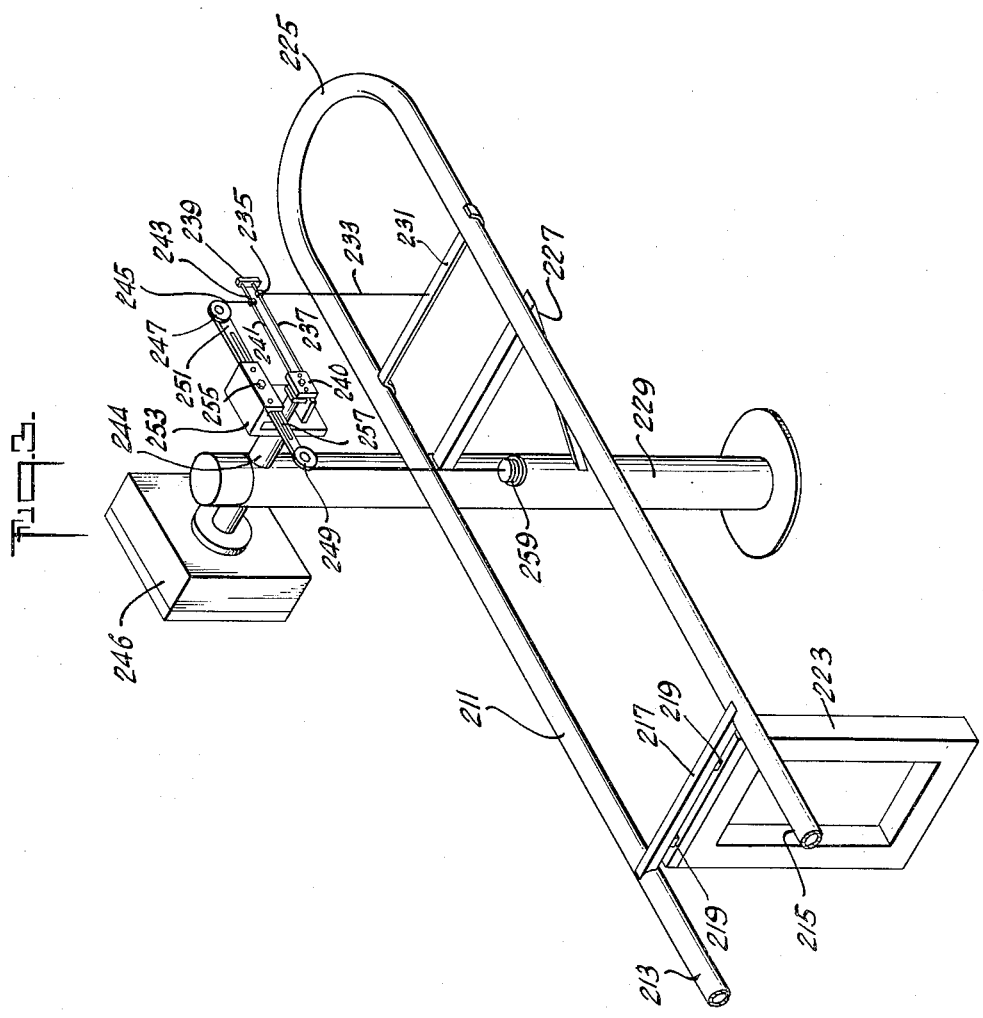

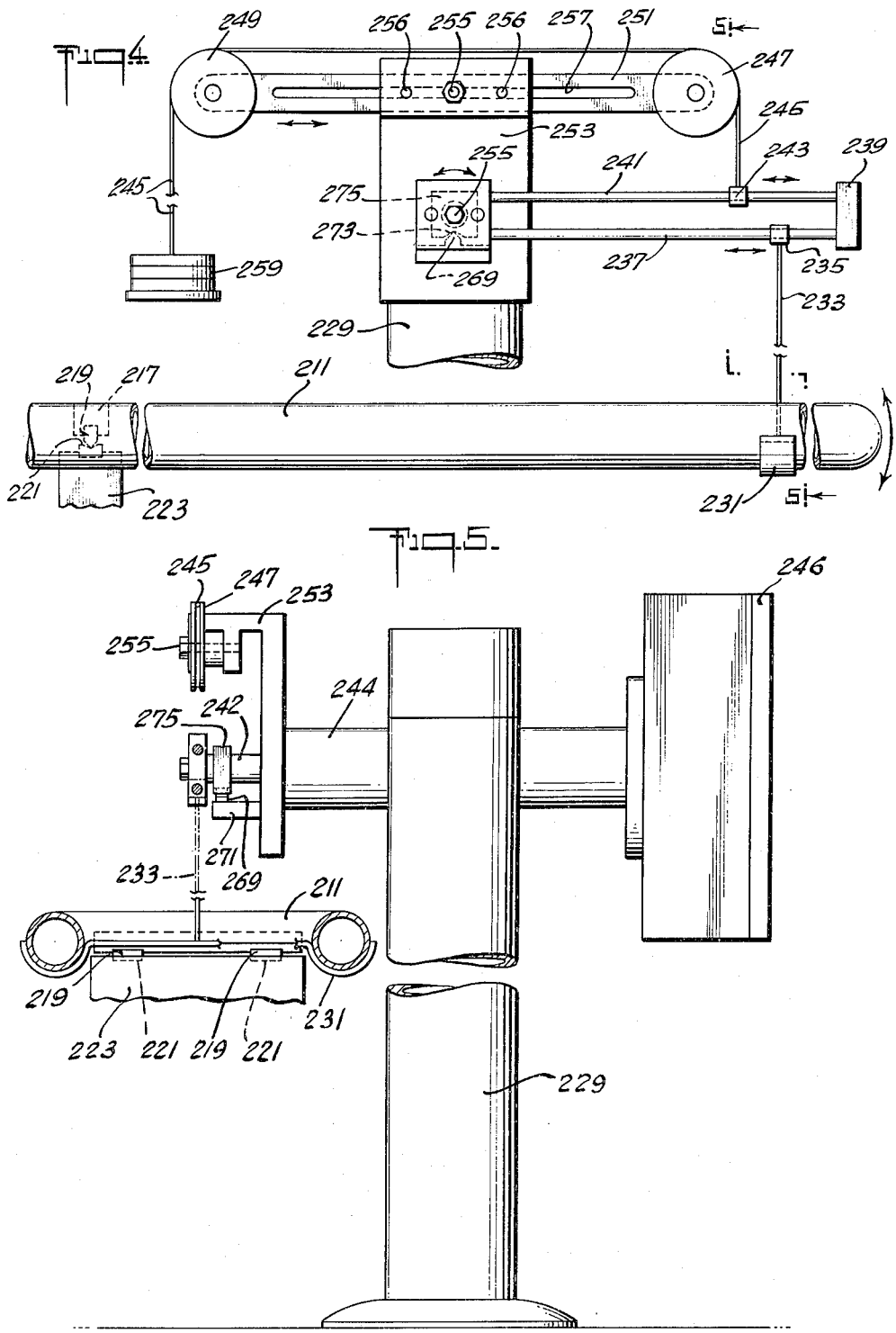

United States Patent Office 3,004,544
Patented Oct. 17, 1961

3,004,544
CONTINUOUSLY MEASURING SLURRY DENSITY
Frank E. Guptill, Jr., Whittier, Calif., assignor to Texaco Inc., a corporation of Delaware
Filed Dec. 29, 1955, Ser. No. 556,251
12 Claims. (Cl. 137—1)

The present invention relates to a novel method of and apparatus for automatically and continuously measuring the density of a flowable mixture of first and second ingredients, such as a mixture of a solid material in a liquid. The invention also concerns automatically controlling and maintaining constant the proportions of two ingredients in such a mixture.

In a specific embodiment of the invention to be described by way of illustration, the principles are applied to measuring and controlling the density of a slurry of talc particles in water being fed to a fluid energy grinding operation. However, they are also applicable to other types of operations such as measuring and controlling the density of paper pulp, coal slurries, ore slurries, etc.

This application is a continuation-in-part of application Ser. 450,506, now Patent 2,885,154, filed August 17, 1954 jointly by du Bois Eastman and Frank E. Guptill, Jr., the present sole applicant.

In accordance with this invention there is provided a novel method for measuring continuously and automatically the density of a flowable mixture of first and second ingredients by passing a stream of the mixture through a conduit having a section that is movable in opposite directions in response to variations in the weight of mixture therein. An indicating device is operatively connected to the movable section so as to indicate the density corresponding to any position of the section.

The rate of feeding of one of the ingredients to the mixture may be changed automatically in response to changes in the position of the movable section, by operatively connecting a feed control device thereto for operation thereby.

Apparatus for performing the novel method described above comprises a vessel holding the mixture, first and second means for feeding the two ingredients to the vessel, a tube mounted for movement up and down proportionately to changes in the specific gravity in the mixture, a flexible tubular coupling on at least one end of the tube, and a conduit connecting the vessel to the coupling for conducting fluid from the vessel to the tube.

For increasing and decreasing the rate of supply of one of the ingredients to the vessel there is provided suitable flow regulating mechanism associated with the feeding means for said ingredient. Automatic control is effected by providing means operably coupling the movable tube with the regulating mechanism and responsive to changes in position of the tube for activating said regulating mechanism to change the rate of supply of the first ingredient and compensate for changes in the specific gravity of the mixture.

As described in the parent of the present application, the present invention is particularly useful for controlling the proportions of particles of a solid material such as talc, in a liquid such as water to provide a slurry of constant composition which is fed to a fluid energy grinding device.

In the drawings:

FIG. 1 is a schematic diagram, parts being in vertical section, showing apparatus for indicating and for automatically controlling the proportions of solid particles in a slurry;

FIG. 2 is a schematic sectional view, parts being in elevation, of a part of the specific gravity meter and controller shown in FIG. 1;

FIG. 3 is a perspective view showing a modified form of specific gravity meter and controller;

FIG. 4 is a front elevational view of the specific gravity meter and controler shown in FIG. 3; and FIG. 5 is a cross sectional view taken along the line 5—5 in FIG. 4.

Referring to FIGS. 1 and 2, slurry from tank 11 passes out through conduit 23 having a pump 25 therein, and enters a horizontal U-shaped tube section or loop 27 having opposite ends connected into the conduits 23 and 29 by flexible hose couplings 171 and 173 which permit section 27 to move in response to variations in the weight of slurry therein. In a typical design, loop 27 is a 1½ inch aluminum pipe 25.7 feet long bent into a loop 12.6 feet long, with its legs 10.5 inches apart.

Loop 27 is supported by a fixed knife-edged fulcrum 175 adjacent the open end 177 of the loop so that the closed end 179 will move up and down as the weight of slurry in the loop fluctuates.

A specific gravity meter 181 comprises a torque tube 183 which is adjustably connected to the mid point of a balancing lever 185 by a nut 186. One end of lever 185 is connected by a pivoted link 187 to the closed end of loop 27. The other end of lever 185 carries balancing counterweights 189. An indicator hand 191 operated by torque tube 183 traverses a scale to indicate the specific gravity of the slurry as reflected by the weight in loop 27. Obviously other means may be employed for converting movement of loop 27 to specific gravity signals, for example a pair of induction coils linked by a core on loop 27, or a photo-electric device responsive to changes in position of the loop.

In calibrating the mechanism the lever 185 and indicator hand 191 are set at zero while flowing plain water fills loop 27, after which nut 186 is tightened. Thereafter, deviations of the indicator hand from zero are proportional to the specific gravity of the slurry.

Torque tube 183 also is connected by a rod 192 and lever arm 194 to a valve 196 (see FIG. 2) to provide a pneumatic signal by varying the pressure of compressed air supplied from a supply line 193 to a conduit 195 which leads to a conventional chart recorder and controller 197. Controler 197 in turn operates a valve connecting a conduit 199 to an air supply line 200 to regulate the pressure in conduit 199 proportionally to the signal from meter 181, thus activating the diaphragm of an air motor 201 to increase or decrease the speed of a variable speed electric motor 203.

Motor 203 is operatively connected to a feed device 205 at the bottom of feed bin 15 to carry solid particles out of the feed bin to the tank 11. Feed device 205 can be of any conventional type such as a worm screw or paddle wheel.

In operation, controller 197 is set to regulate motor 203 at a normal constant speed when the slurry in tank 11 has the desired composition and specific gravity meter 181 is at a position indicating a specific gravity corresponding to the desired composition.

If for any reason the feed rate of solid particles from feed bin 15 is insufficient to maintain the desired composition, the specific gravity of the slurry drops off with the result that the weight of material in loop 27 decreases, the closed loop end 179 rises and the speed of feed device 205 increases to increase the particle feed rate and bring the specific gravity and composition back to normal.

Conversely, if the feed rate is too great, the specific gravity increases, the closed loop end 179 falls, and the speed of feed device 205 is decreased automatically to decrease the particle feed rate.

The method and apparatus for automatic control described above are especially advantageous where the feed rate of water from water tank 103 may be variable, as changes in water feed require compensating changes in solids feed.

Referring to FIGS. 3 to 5 there is shown a modified form of the specific gravity meter wherein a balanced hair pin tube 211 has open ends 213 and 215 for connection to flexible couplings. A cross bar 217 near the open ends is welded to the two legs of the tube and carries a pair of knife edges 219 which are mounted in V grooves 221 on the top of a support 223. The closed end 225 of the tube is free for movement up and down, but a bracket 227 projecting from a support post 229 a short distance below the tube limits downward movement.

Near the closed end 225 there is provided a cross bar 231 having two saddles at its ends within which the two legs of the tube rest. Crossbar 231 is movable lengthwise of the tube 211. A flexible cable 233 extends vertically from the center of cross bar 231 up to a connecting link 235 which is slidably mounted on the lower bar 237 of a horizontal lever arm 239 having one end free and the other connected at 240 on the end of a shaft 242 which passes through a casing 244 on post 229 and into control box 246.

Lever 239 also includes an upper bar 241 parallel to the lower one, and upon which is slidably mounted a second connecting link 243 to which is coupled a counter balancing cable 245 running over a pair of pulleys 247 and 249 carried on opposite ends of a horizontal bar 251. The bar 251 is secured within a channel in a supporting bracket 253 by a bolt 255 and a pair of guide pins 256 passing through the bracket and through a longitudinal slot 257 in the bar, whereby the position of the bar in the bracket may be adjusted at will. The opposite end of cable 245 extends down from pulley 249 and carries counterweights 259 for balancing the weight of the hairpin tube 211.

A bending moment in the shaft 242 is prevented by supporting its outer end upon a knife edge 269 which is carried by a bracket 271 extending outwardly from bracket 253 below the shaft. The knife edge 269 extends up into a mating groove 273 in a collar 275 secured on the shaft.

Control box 246, of course, is electrically connected to a suitable indicator of specific gravity, and, when operating with automatic feed control, is connected electrically to a feed controller as described in connection with FIG. 1.

The construction described in connection with FIGS. 3 to 5 inclusive, is particularly advantageous because the counterbalancing arrangement is such that the downwardly pulling weight of the hairpin tube 211 is counterbalanced by an upward pull generated by the counterweights 259. Consequently the apparatus can operate without generating a large bending moment in the shaft 242, such as may be encountered with the construction of FIGS. 1 and 2.

Furthermore, proper calibration of the mechanism so that the indicating device and the feed mechanism are set at zero when only water is flowing through tube 211, may be accomplished readily and accurately by changing the position of bar 251 in bracket 253, and by changing the adjustment of sliding links 243 and 235 along their respective bars, as well as by shifting the position of crossbar 231 along tube 211 as necessary to keep cable 233 vertical.

Another important feature of this adjustable construction is that the cables 245 and 233 may always be located close together so that the downward pull of the tube 211 and the upward pull of the counterweights 259 are directly opposite one another so as to avoid lateral distortion of the shaft 242.

Obviously, many modifications and variations of the invention, as hereinbefore set forth, may be made without departing from the spirit and scope thereof, and therefore only such limitations should be imposed as are indicated in the appended claims.

I claim:

1. A method for maintaining automatically a substantially constant ratio of first comminuted solid and second liquid ingredients in a flowable mixture thereof, said mixture being made up by feeding said ingredients into a vessel, said method comprising automatically regulating the flow of liquid into said vessel in accordance with changes in the level of the flowable mixture therein thereby maintaining a substantially constant level, and automatically regulating the rate of feeding said solid ingredients by passing a stream of said mixture through a conduit having a section that is movable in opposite directions in response to variations in the weight of mixture therein, and automatically changing the rate of feeding of said comminuted solid ingredients to said mixture in response to changes in the position of said movable section.

2. Apparatus for automatically maintaining substantially constant the ratio of first comminuted solid and second liquid ingredients in a flowable mixture thereof, said apparatus comprising a vessel holding said mixture; first and second means for supplying said first and second ingredients to said vessel; flow control mechanism responsive to the level of the flowable mixture in said vessel and coacting with said second means to regulate the flow of liquid into said vessel automatically in accordance with changes in said level, to maintain said level substantially constant; a tube mounted for movement up and down proportionately to changes in the specific gravity of said mixture; a conduit connecting said vessel to said tube for conducting fluid from said vessel to said tube; means for causing fluid flow through said conduit; regulating mechanism associated with said first means for increasing and decreasing the rate of supply of said first comminuted solid ingredient to said vessel; and means operatively coupling said tube with said regulating mechanism, and responsive to changes in the position of said tube for actuating said regulating mechanism to change the rate of supply of said first comminuted solid ingredient and compensate for changes in the specific gravity of said mixture.

3. Apparatus in accordance with claim 2, wherein said tube is in the form of a loop having an open end and a closed end, wherein said apparatus also comprises a fixed support for said loop adjacent said open end whereby said loop is movable on said support as a fulcrum, and wherein said last-named means is responsive to changes in the position of said closed end.

4. Apparatus responsive to changes in the specific gravity of a fluid flowing through a conduit, comprising a tube, at least one flexible coupling connecting said tube into said conduit for admitting a flow of fluid into said tube while permitting movement of said tube up and down proportionately to changes in the specific gravity of said fluid; a shaft; means coupling said tube to said shaft and operative to convert movement of said tube up and down into rotative movement of said shaft, said means comprising a lever arm projecting from said shaft and a link extending from said tube to said lever arm; and a counter balancing device connected to said lever arm for counter balancing the force exerted by said tube, said counter balancing device comprising a second link extending from said lever arm in a direction away from said first named link, and means for tensioning said second link.

5. Apparatus in accordance with claim 4, wherein said means for tensioning said second link comprises a second arm, pulley means carried by said second arm, a cable leading from said lever arm over said pulley means, and a counterweight carried by said cable.

6. Apparatus in accordance with claim 5 wherein both said first-named link and said second link are connected to said lever arm for movement at will lengthwise thereof to adjust the force exerted on said shaft.

7. Apparatus in accordance with claim 6 wherein said second arm is adjustable at will to maintain said second link vertical, and wherein said first-named link is adjustably coupled to said tube for movement therealong to maintain said first-named link vertical.

8. Apparatus responsive to changes in the specific gravity of a fluid flowing through a conduit, comprising a tube, at least one flexible coupling connecting said tube into said conduit for admitting a flow of fluid into said tube while permitting movement of said tube up and down proportionately to changes in the specific gravity of said fluid; a shaft; means coupling said tube to said shaft and operative to convert movement of said tube up and down into rotative movement of said shaft; control mechanism for controlling the specific gravity of said fluid; and pneumatic mechanism operatively connecting said control mechanism to said shaft and operable thereby in response to changes in the position of said shaft resulting from changes in the specific gravity of said fluid.

9. Apparatus responsive to changes in the specific gravity of a fluid flowing through a conduit, comprising a tube, at least one flexible coupling connecting said tube into said conduit for admitting a flow of fluid into said tube while permitting movement of said tube up and down proportionately to changes in the specific gravity of said fluid; a shaft, means coupling said tube to said shaft and operative to convert movement of said tube up and down into rotative movement of said shaft, said last named means comprising a lever arm connected to said shaft and extending horizontally therefrom, said lever arm comprising two parallel tracks and a pair of links movable independently along said tracks; said apparatus also comprising means connecting said tube to one of said links; said apparatus also comprising a counter balancing device connected to the other of said links for counter balancing the force exterted by said tube.

10. Apparatus for continuously measuring the specific gravity of a fluid comprising a horizontal U-tube having two legs connected together at one end; supporting means for said U-tube located at a position spaced from said end, said tube projecting as a cantilever from said supporting means; means for circulating fluid through said U-tube; sensing means continuously responsive to the position of said U-tube for continuously sensing said position; and pneumatic means responsive to said sensing means for continuously providing a signal display whose magnitude varies in proportion to changes in the position of said U-tube detected by said sensing means.

11. Apparatus in accordance with claim 10, also comprising counterbalancing means cooperating with said U-tube for counterbalancing said U-tube; and wherein said sensing means detects deviations in the counterbalanced position of said U-tube.

12. Apparatus for continuously measuring the specific gravity of a fluid comprising a horizontal U-tube having two parallel legs and passage means at one end thereof establishing communication between said legs; supporting means for said legs of said tube located at a position spaced from said end, said tube projecting as a cantilever from said supporting means; first and second conduits connected to said legs; means for circulating fluid through said first conduit to one of said legs, through said passage means to the other of said legs, and back through said second conduit; mechanism for continuously converting changes in the position of a member to changes in magnitude of a signal, one of said mechanism and said U-tube being spaced above the other; a connecting member extending from said U-tube at a position spaced from said supporting means to said mechanism whereby changes in the position of said U-tube due to changes in specific gravity of said fluid are converted into changes in magnitude of said signal, and said connecting member being connected to said mechanism for adjustment thereon in a direction parallel to said legs whereby said connecting member is maintainable in a vertical position; and an indicator connected to said mechanism and operable in response to changes in said signal to indicate the specific gravity of said fluid continuously.

References Cited in the file of this patent

UNITED STATES PATENTS

| 1,511,604 | Ganucheau | Oct. 14, 1924 |
| 2,311,312 | Marsh | Feb. 16, 1943 |
| 2,321,175 | Binckley | June 8, 1943 |
| 2,432,039 | Plank | Dec. 2, 1947 |
| 2,669,118 | Nichols | Feb. 16, 1954 |
| 2,719,018 | Sebardt | Sept. 27, 1955 |
| 2,745,484 | Eckstom et al. | May 15, 1956 |

FOREIGN PATENTS

| 82,473 | Sweden | Jan. 29, 1935 |

OTHER REFERENCES

Instrument Practice, May 1954, page 447 (73-434).